(12) United States Patent
Kakuda et al.

(10) Patent No.: US 11,879,080 B2
(45) Date of Patent: Jan. 23, 2024

(54) HOT MELT ADHESIVE

(71) Applicant: HENKEL AG & CO. KGAA, Duesseldorf (DE)

(72) Inventors: Atsushi Kakuda, Osaka (JP); Naohiro Maeda, Osaka (JP)

(73) Assignee: HENKEL AG & CO. KGaA, Duesseldorf (DE)

( * ) Notice: Subject to any disclaimer, the term of this patent is extended or adjusted under 35 U.S.C. 154(b) by 851 days.

(21) Appl. No.: 16/720,129

(22) Filed: Dec. 19, 2019

(65) Prior Publication Data

US 2020/0123418 A1 Apr. 23, 2020

Related U.S. Application Data

(63) Continuation of application No. PCT/JP2018/022947, filed on Jun. 15, 2018.

(30) Foreign Application Priority Data

Jun. 30, 2017 (JP) ................. 2017-128174

(51) Int. Cl.
| | |
|---|---|
| *C09J 7/35* | (2018.01) |
| *C09J 7/38* | (2018.01) |
| *C08L 23/20* | (2006.01) |
| *C08L 91/00* | (2006.01) |
| *C09J 11/08* | (2006.01) |
| *C09J 123/08* | (2006.01) |
| *C09J 123/12* | (2006.01) |

(52) U.S. Cl.
CPC ............... *C09J 7/35* (2018.01); *C08L 23/20* (2013.01); *C08L 91/00* (2013.01); *C09J 7/381* (2018.01); *C09J 11/08* (2013.01); *C09J 123/0815* (2013.01); *C09J 123/12* (2013.01); C08L 2205/035 (2013.01); C08L 2314/06 (2013.01)

(58) Field of Classification Search
CPC ..... C09J 7/35; C09J 7/381; C09J 11/08; C09J 123/0815; C09J 123/12; C09J 123/08; C09J 2301/304; C08L 23/20; C08L 91/00; C08L 2205/035; C08L 2314/06; C08L 2205/03; C08L 23/12; C08L 23/22; C08K 5/01

See application file for complete search history.

(56) References Cited

U.S. PATENT DOCUMENTS

| | | | |
|---|---|---|---|
| 2014/0199545 A1* | 7/2014 | Moriguchi | C09J 123/08 525/240 |
| 2016/0160086 A1* | 6/2016 | Schneider | C08L 53/02 428/500 |

FOREIGN PATENT DOCUMENTS

| | | |
|---|---|---|
| CN | 103476888 A | 12/2013 |
| CN | 103797081 A | 5/2014 |
| CN | 103946333 A | 7/2014 |
| JP | 2013-064055 A | 4/2013 |
| JP | 2014-208812 A | 11/2014 |
| JP | 2016-524002 A | 8/2016 |
| WO | 2012129489 A2 | 9/2012 |
| WO | 2013/039261 A1 | 3/2013 |
| WO | 2013052875 A1 | 4/2013 |
| WO | 2016/167931 A1 | 10/2016 |

\* cited by examiner

*Primary Examiner* — Angela C Scott
(74) *Attorney, Agent, or Firm* — Sun Hee Lehmann

(57) ABSTRACT

Disclosed is a hot melt adhesive comprising: (A) a metallocene based propylene homopolymer, (B) a metallocene based ethylene/α-olefin copolymer, (C) a tackifier resin, and (D) a plasticizer, wherein the plasticizer (D) comprises (D1) an oil and (D2) at least one polymer selected from polybutene, polybutadiene, polyisobutylene, and polyisoprene. This hot melt adhesive has an initial adhesive strength enough to enable a pressure sensitive adhesion body to stick easily on a member, thus making it possible to firmly hold the pressure sensitive adhesion body on the member. The hot melt adhesive is also excellent in releasability, thus causing no adhesive residue on the member when the pressure sensitive adhesion body is peeled from the member.

4 Claims, No Drawings

HOT MELT ADHESIVE

FIELD OF THE INVENTION

The present invention relates to a hot melt adhesive, and more particularly to a hot melt adhesive which is useful as a pressure sensitive adhesive.

As used herein, the "pressure sensitive" is a specific concept of "adhesive", and the "adhesive" comprises both "pressure sensitive adhesive" and "non-pressure sensitive adhesive".

BACKGROUND OF THE INVENTION

A hot melt adhesive can be used without a solvent and can perform high-speed bonding and therefore has environmental and economic benefits. Thus, the hot melt adhesive is used in various fields such as bookbinding, packing materials, automobile interior materials, and woodworking.

From the viewpoint of flexibility and cost, there have been used, as a main component of the hot melt adhesive, ethylene based copolymers such as an ethylene/vinyl acetate copolymer (EVA) and an ethylene/ethyl acrylate copolymer (EEA), and thermoplastic resins such as a styrene block copolymer. In the case of bonding to polyolefin based members of polypropylene and polyethylene, olefin based polymers such as polypropylene based resin and ethylene/α-olefin are used as a main component of the hot melt adhesive.

JP 2013-064055 A, JP 2014-208812 A, and JP 2016-524002 A disclose hot melt adhesives comprising an olefin polymer as a main component.

The hot melt adhesive of JP 2013-064055 A comprises a metallocene based propylene homopolymer obtained by polymerization in the presence of a metallocene catalyst, and an ethylene based copolymer (see JP 2013-064055 A, [claim 1], [0078], [0079], [Table 1] and [Table 3]). The hot melt adhesive of JP 2013-064055 A is excellent in high-speed coating and spiral coating and is also excellent in adhesion between a polyethylene film and a nonwoven fabric (see JP 2013-064055 A, [0095], [Table 1], [0097] and [Table 3]).

JP 2014-208812 A discloses a hot melt adhesive comprising an ethylene/α-octene copolymer, a polypropylene homopolymer having a softening point of 80 to 120° C., and a wax (JP 2014-208812 A, [claim 1] to [claim 2], [0056], [Table 1]).

The hot melt adhesive of JP 2014-208812 A is excellent in both heat-resistant adhesion and cold-resistant adhesion and is suitable for bonding of a paper packaging material (see JP 2014-208812 A, [claim 6] and [0038]).

The hot melt adhesive of JP 2016-524002 A comprises a polypropylene polymer having a low molecular weight and a low modulus (see JP 2016-524002 A, [claim 1] and [0001]). The hot melt adhesive of JP 2016-524002 A is employed in sealing of a paper box and a corrugated cardboard box, a label for a wide variety of applications, and a disposable diaper (see JP 2016-524002 A, [0002]). When employed in the disposable diaper, strike-through to a nonwoven fabric is prevented (see JP 2016-524002 A, [0067], [Table 6], [0068]).

An olefin based hot melt adhesive has been employed in a variety of fields. In recent years, consumers have sometimes required that the olefin based hot melt adhesive has pressure sensitive adhesive action which is the same as that of a styrene based hot melt adhesive.

When a pressure sensitive adhesive tape is produced by applying each of the hot melt adhesives of JP 2013-064055 A, JP 2014-208812 A, and JP 2016-524002 A on a tape, all of the hot melt adhesives are not satisfactory as a pressure sensitive adhesive.

The hot melt adhesives of JP 2013-064055 A and JP 2014-208812 A, exhibit low tack and are inferior in initial adhesion, so that it is not easy to stick each of the pressure sensitive adhesive tapes on various members (or adherends). It is also inferior in holding force since it has too low strength when it is peeled.

The hot melt adhesive of JP 2016-524002 A exhibits too high strength when a pressure sensitive adhesive tape is peeled after sticking on a member, so that an adhesive residue (or adhesive deposit) may occur on the member, and cause the pressure sensitive adhesive tape to break.

As mentioned above, the olefin based hot melt adhesives disclosed in JP 2013-064055 A, JP 2014-208812 A, and JP 2016-524002 A are not suitable as a pressure sensitive adhesive.

It is necessary for the pressure sensitive adhesive to be excellent in initial adhesive strength when a pressure sensitive adhesive tape is stuck on a member, to hold firmly the pressure sensitive adhesive tape on the member after the pressure sensitive adhesive tape is stuck, and to have appropriate peel strength so that the pressure sensitive adhesive tape can be peeled from the member.

Therefore, it is needed to develop an olefin hot melt adhesive, which is excellent in balance among initial adhesive strength, holding force, and releasability, and is useful as a pressure sensitive adhesive, in various fields.

SUMMARY OF THE INVENTION

The present invention solves the above conventional problems and an object thereof is to provide an olefin hot melt adhesive which is excellent in balance among initial adhesive strength, holding force, and releasability, and is useful as a pressure sensitive adhesive.

The present inventors have intensively studied and found that it is possible to obtain an olefin hot melt adhesive which is excellent in balance among initial adhesive strength, holding force, and releasability, and is useful as a pressure sensitive adhesive, by blending a specific metallocene based olefin polymer and a specific plasticizer, thus completing the present invention.

The present invention provides, in an aspect, a hot melt adhesive, which comprises:

(A) a metallocene based propylene homopolymer, (B) a metallocene based ethylene/α-olefin copolymer, (C) a tackifier resin, and (D) a plasticizer, wherein the plasticizer (D) comprises (D1) an oil and (D2) at least one polymer selected from polybutene, polybutadiene, polyisobutylene, and polyisoprene.

The present invention provides, in an embodiment, a hot melt adhesive, wherein the oil (D1) comprises a naphthene oil.

The present invention provides, in another embodiment, a hot melt adhesive, wherein the polymer (D2) comprises polybutene.

The present invention provides, in a preferred embodiment, a hot melt adhesive which comprises the (D2) in an amount of 5 to 90 parts by weight based on 100 parts by weight of the total weight of the oil (D1) and the polymer (D2).

The present invention provides, in a further embodiment, a hot melt adhesive, wherein the metallocene based propylene homopolymer (A) has a melting point of 100° C. or lower.

The present invention provides, in another aspect, a pressure sensitive adhesion body coated with the hot melt adhesive.

The present invention provides, in a preferred aspect, a pressure sensitive adhesion product comprising the pressure sensitive adhesion body.

As used herein, the "pressure sensitive adhesive" refers to a binder which adheres upon mere contact and immediately exhibits an adhesive force enough to withstand practical use without involving a change in the state from a liquid to a solid.

Whereas, in addition to the above-mentioned "pressure sensitive adhesive", the "adhesive" refers to a binder comprising "non-pressure sensitive adhesive". The "non-pressure sensitive adhesive" means a binder which requires a change in the state from a liquid to a solid so as to exhibit an adhesive force enough to withstand practical use and is also simply referred to as the "adhesive", usually. The "non-pressure sensitive adhesive" requires a process to change from a liquid to a solid, such as vaporization of a solvent, cooling, or chemical reaction, when an adhesive force is generated, and requires a substantial solidification time.

The hot melt adhesive according to the present invention comprises (A) a metallocene based propylene homopolymer, (B) a metallocene based ethylene/α-olefin copolymer, (C) a tackifier, and (D) a plasticizer, and the plasticizer (D) comprises (D1) an oil and (D2) at least one polymer selected from polybutene, polybutadiene, polyisobutylene, and polyisoprene. Therefore, the hot melt adhesive has performances as a pressure sensitive adhesive and is excellent in balance among initial adhesive strength, holding force, and releasability, and is useful as a pressure sensitive adhesive.

More specifically, the hot melt adhesive of the present invention has initial adhesion enough to enable a pressure sensitive adhesion body produced by using it to stick easily on a member (or adherend), thus making it possible to firmly hold the pressure sensitive adhesion body on the member (or to have sufficient holding force). The hot melt adhesive is also excellent in releasability, and causes no adhesive residue (or adhesive deposit) on the member when the pressure sensitive adhesion body is peeled from the member.

Each component included in the hot melt adhesive of the present invention will be described below.

<(A) Metallocene Based Propylene Homopolymer>

The hot melt adhesive of the present invention comprises (A) a metallocene based propylene homopolymer (hereinafter also referred to as "propylene homopolymer (A)").

As used herein, a "metallocene based polyolefin" refers to a polymer obtained by polymerization of olefin in the presence of a metallocene catalyst.

Namely, the metallocene based propylene homopolymer (A) refers to a homopolymer obtained by polymerization of propylene in the presence of a metallocene catalyst, and is not particularly limited as long as the objective hot melt adhesive of the present invention can be obtained.

The metallocene based propylene homopolymer (A) comprises a chemical structure based on (or derived from) a metallocene catalyst in the molecule. The "chemical structure based on a metallocene catalyst" comprises, for example, a chemical structure of a metallocene catalyst itself represented by the following formula (I), or a chemical structure comprising a modified product of the formula (I), and is not particularly limited as long as the objective hot melt adhesive of the present invention can be obtained.

Chemical Formula 1

(I)

In the formula (I), M represents a metal (e.g., Ti, Zr, Hf, V, Cr, Mn, Ni, Fe, Co, Pd, etc.), or a metal combined with a halogen atom, etc., and two dicyclopentadienide (or dicyclopentadienyl) groups may be further condensed with a benzene ring and those rings may be appropriately substituted with a substituent, and those rings may be appropriately linked through a linking group such as a methylene group.

The hot melt adhesive of the present invention comprises the metallocene based propylene homopolymer (A), so that initial adhesive strength is more improved, thus enabling a pressure sensitive adhesion body to stick easier on a member, and leading to an increase in force for holding a tape on a member.

In the present invention, the propylene homopolymer (A) preferably has a melting point of 100° C. or lower, more preferably 60 to 95° C., and most preferably 65 to 90° C.

The melting point refers to a value measured by differential scanning calorimetry (DSC). Specifically, after weighing 10 mg of a sample in an aluminum container, the measurement is carried out at a temperature rise rate of 5° C./min using DSC6220 (trade name) manufactured by SII NanoTechnology Inc., and a temperature of a top of a fusion peak refers to the melting point.

When propylene is polymerized using a metallocene catalyst, a propylene homopolymer having (i) crystallinity and (ii) very narrow molecular weight distribution is synthesized.

The item (i) means that complete isotacticity and syndiotacticity can be optionally controlled. Therefore, it is possible to obtain a polymer with uniform arrangement and ratio of methyl groups without causing deviation of crystallinity, and a low crystalline site that can cause a decrease in adhesive force is less likely to be formed. Therefore, when using the hot melt adhesive of the present invention, a pressure sensitive adhesion body can be more easily attached to a member and a force of holding the pressure sensitive adhesion body on the member can increase.

With respect to the item (ii), polydispersity (Mw/Mn) indicating the degree of molecular weight distribution of the propylene homopolymer (A) can fall within a range of 1.0 to 3.0. When using a propylene homopolymer having polydispersity of 1.0 to 3.0, an adhesive force of the hot melt adhesive can be more improved. The molecular weight distribution is a concept which indicates distribution of a molecular weight of a synthetic polymer, and a ratio (the above-mentioned polydispersity Mw/Mn) of a weight average molecular weight (Mw) to a number average molecular weight (Mn) may serve as an indicator. In the present invention, Mw, Mn, and molecular weight distribution are measured by gel permeation chromatography (GPC).

Examples of the propylene homopolymer (A) include (A1) a metallocene based propylene homopolymer having a weight average molecular weight of 60,000 or less (hereinafter also referred to as "propylene homopolymer (A1)"), (A2) a metallocene based propylene homopolymer having a weight average molecular weight of more than 60,000 and 90,000 or less (hereinafter also referred to as "propylene homopolymer (A2)"), and (A3) a metallocene based propylene homopolymer having a weight average molecular weight of more than 90,000 (hereinafter also referred to as "propylene homopolymer (A3)").

The propylene homopolymer (A1) preferably has a weight average molecular weight of 30,000 to 60,000, and particularly preferably 30,000 to 55,000.

The propylene homopolymer (A2) preferably has a weight average molecular weight of more than 60,000 and less than 90,000 or less, and more preferably more than 60,000 and 80,000 or less.

The propylene homopolymer (A3) preferably has a weight average molecular weight of more than 90,000 and 150,000 or less, and more preferably more than 90,000 and 120,000 or less.

It is possible to use, as the propylene homopolymer (A), commercially available products. Examples thereof include L-MODU (trade name) manufactured by Idemitsu Kosan Co., Ltd., WINTEC (trade name) manufactured by Japan Polypropylene Corporation, and the like.

Examples of the propylene homopolymer (A1) include L-MODU X400S (trade name) manufactured by Idemitsu Kosan Co., Ltd.; examples of the propylene homopolymer (A2) include L-MODU X600S (trade name) manufactured by Idemitsu Kosan Co., Ltd.; and examples of the propylene homopolymer (A3) include L-MODU X900S (trade name) manufactured by Idemitsu Kosan Co., Ltd.

In the present invention, the propylene homopolymer (A) preferably comprise the propylene homopolymer (A1) and may also comprise the propylene homopolymer (A2) and/or the propylene homopolymer (A3).

The propylene homopolymer (A) may only comprise the propylene homopolymer (A2) or the propylene homopolymer (A3), without comprising the propylene homopolymer (A1).

In the present invention, the amount of the propylene homopolymer (A) is preferably 3 parts by weight or more and less than 60 parts by weight, more preferably 5 to 55 parts by weight, and most preferably 15 to 45 parts by weight, based on 100 parts by weight of the total weight of the propylene homopolymer (A) and the metallocene based ethylene/α-olefin copolymer (B).

When the propylene homopolymer (A) is blended in an amount of the above range, the hot melt adhesive of the present invention can maintain balance between holding force and releasability, satisfactorily and preferably.

When using the hot melt adhesive of the present invention as a pressure sensitive adhesive, it is possible to hold the pressure sensitive adhesion body on a member of paper, plastic and the like without causing its positional displacement and, when the pressure sensitive adhesion body is peeled from the member, no adhesive remains on the member, i.e., no adhesive residue (or adhesive deposit) occurs.

The hot melt adhesive of the present invention is also excellent in coating suitability by blending the propylene homopolymer (A) in the above range.

The weight average molecular weight (Mw) means a value measured by gel permeation chromatography (GPC). Specifically, the weight average molecular weight can be obtained by measuring a value using the following apparatus and measuring method. RI manufactured by Waters Corporation is used as a detector. TSKGEL GMHHR-H(S) HT manufactured by TOSOH CORPORATION is used as a GPC column. A sample is dissolved in 1,2,4-trichlorobenzene and allowed to flow at a flow rate of 1.0 ml/min and a measuring temperature of 145° C. to obtain a measured value of the molecular weight. The objective weight average molecular weight is obtained by conversion of the measured molecular weight using a calibration curve derived based on polypropylene.

Since the number average molecular weight (Mn) is also determined by the same method, the molecular weight distribution is also calculated by GPC. Mw, Mn, and molecular weight distribution of components other than the component (A) are determined in the same manner.

When the propylene homopolymer (A) comprises the propylene homopolymer (A1), the hot melt adhesive of the present invention is more excellent in low-temperature coating while maintaining a holding force to a member of a polyethylene film, a nonwoven fabric and the like. Therefore, when the hot melt adhesive of the present invention is used as a pressure sensitive adhesive, the pressure sensitive adhesion body can be easily attached to the member and the occurrence of adhesive residue can be prevented.

<(B) Metallocene Based Ethylene/α-Olefin Copolymer>

The hot melt adhesive of the present invention comprises (B) a metallocene based ethylene/α-olefin copolymer (hereinafter also referred to as "ethylene/α-olefin copolymer (B)").

In the present invention, the metallocene based ethylene/α-olefin copolymer (B) is a polymer obtained by copolymerization of ethylene with α-olefin in the presence of a metallocene catalyst and is not particularly limited as long as it comprises a chemical structure based on (or derived from) the metallocene catalyst in the molecule and the objective hot melt adhesive of the present invention can be obtained. The "chemical structure based on the metallocene catalyst" comprises, for example, a chemical structure of the metallocene catalyst itself represented by the previously mentioned formula (I), or a chemical structure comprising a modified product of the formula (I).

Examples of the metallocene based ethylene/α-olefin copolymer (B) include an ethylene/propylene copolymer, an ethylene/octene copolymer, an ethylene/butene copolymer, and an ethylene/propylene/butene copolymer obtained by polymerization in the presence of a metallocene catalyst, and an ethylene/propylene copolymer and an ethylene/octene copolymer are particularly desirable.

When the metallocene based ethylene/α-olefin copolymer (B) comprises, for example, an ethylene/propylene copolymer, an ethylene/octene copolymer, an ethylene/butene copolymer, and an ethylene/propylene/butene copolymer obtained by polymerization in the presence of a metallocene catalyst, the hot melt adhesive of the present invention is more excellent in initial adhesive strength and peel strength, and is less likely to cause adhesive residue and is more excellent in balance.

When the metallocene based ethylene/α-olefin copolymer (B) comprises an ethylene/propylene copolymer, the hot melt adhesive of the present invention exhibits more improved initial adhesive strength and peel strength, and is less likely to cause adhesive residue, and the hot melt adhesive can be used as a pressure sensitive adhesive having higher performances.

When the metallocene based ethylene/α-olefin copolymer (B) comprises an ethylene/octene copolymer, the hot melt adhesive of the present invention is more excellent in low-temperature coating suitability and is more excellent in initial adhesive strength and peel strength, and is less likely to cause adhesive residue, thus obtaining a pressure sensitive adhesive which is more excellent in balance among performances.

The "metallocene based ethylene/propylene copolymer" comprised in the component (B) preferably has a melt index at 230° C. of 200 g/10 min or less, more preferably 10 to 50 g/10 min, and most preferably, 15 to 30 g/10 min. When the melt index is in the above range, peel strength (holding force) of the hot melt adhesive can be more improved. Therefore, when the hot melt adhesive of the present invention is used as a pressure sensitive adhesive, it is possible to more firmly hold a pressure sensitive adhesion body without causing its positional displacement from a member.

As used herein, the melt index means an index which indicates fluidity of a resin, and is indicated by an amount of a synthetic resin which is extruded through an opening (nozzle) provided on a bottom of a cylindrical vessel, per 10 minutes while heating a predetermined amount of the synthetic resin in the cylindrical vessel heated with a heater at a predetermined temperature (e.g., 230° C.) under a predetermined load (e.g., 2.16 kg). A unit: g/10 min is used. The melt index is measured by the measurement method defined in ASTM D1238.

<(C) Tackifier Resin>

The hot melt adhesive of the present invention comprises (C) a tackifier resin. The tackifier resin is not particularly limited as long as it is usually used as a tackifier resin in a hot melt adhesive and the objective hot melt adhesive of the present invention can be obtained.

The tackifier resin (C) is preferably blended in an amount of 50 to 250 parts by weight, more preferably 80 to 220 parts by weight, and particularly preferably 100 to 220 parts by weight, based on 100 parts by weight of the total weight of the propylene homopolymer (A) and the ethylene/α-olefin copolymer (B).

When the tackifier resin (C) is blended in an amount of the above range, the hot melt adhesive can be used for low-temperature coating at 150° C. or lower and coating at 160° C. and also can be uniformly applied to a polyethylene film, a nonwoven fabric, a paper and the like, thus enabling a pressure sensitive adhesion body to stick (or adhere) easily on various members.

Examples of the tackifier resin (C) include a natural rosin, a modified rosin, a hydrogenated rosin, a glycerol ester of a natural rosin, a glycerol ester of a modified rosin, a pentaerythritol ester of a natural rosin, a pentaerythritol ester of a modified rosin, a pentaerythritol ester of a hydrogenated rosin, a copolymer of a natural terpene, a terpolymer of a natural terpene, hydrogenated derivatives of a copolymer of a hydrogenated terpene, a polyterpene resin, hydrogenated derivatives of a phenol based modified terpene resin, an aliphatic petroleum hydrocarbon resin, hydrogenated derivatives of an aliphatic petroleum hydrocarbon resin, an aromatic petroleum hydrocarbon resin, hydrogenated derivatives of an aromatic petroleum hydrocarbon resin, a cyclic aliphatic petroleum hydrocarbon resin, hydrogenated derivatives of a cyclic aliphatic petroleum hydrocarbon resin, and the like.

These tackifier resins can be used alone, or in combination. It is also possible to use a liquid type tackifier resin as a tackifier resin, as long as it has a colorless to pale yellow color tone and has substantially no odor, and also has satisfactory compatibility with other components. Taking these characteristics into consideration comprehensively, the tackifier resin is preferably hydrogenated derivatives of a petroleum hydrocarbon resin, and particularly preferably a hydrogenated dicyclopentadiene based resin.

It is possible to use, as the tackifier resin (C), commercially available products. Examples of these commercially available products include Alcon P100 (trade name) and Alcon M100 (trade name) manufactured by Arakawa Chemical Industries, Ltd.; Clearon M105 (trade name) manufactured by YASUHARA CHEMICAL CO., LTD.; ECR5400 (trade name) and ECR179EX (trade name) manufactured by Exxon Corporation; and Quinton DX395 (trade name) manufactured by Zeon Corporation. These commercially available tackifier resins can be used alone, or in combination.

<(D) Plasticizer>

The hot melt adhesive of the present invention includes (D) a plasticizer.

The plasticizer (D) is blended in a polymer for the purpose of an improvement in processability, imparting flexibility, and a decrease in melt viscosity, and is not particularly limited as long the objective hot melt adhesive of the present invention can be obtained.

By comprising the plasticizer (D), the hot melt adhesive of the present invention can be applied at 160° C. and can be used as a pressure sensitive adhesive, thus making it possible to impart tack and making it difficult to cause adhesive residue when a pressure sensitive adhesion body stuck on the member is peeled from a member.

The plasticizer (D) is preferably blended in an amount of 50 to 150 parts by weight, more preferably 100 to 150 parts by weight, and particularly preferably 110 to 140 parts by weight, based on 100 parts by weight of the total weight of the propylene homopolymer (A) and the ethylene/α-olefin copolymer (B).

When the plasticizer (D) is blended in an amount of the above range, tack is further imparted to the hot melt adhesive, leading to further improvement in initial adhesive strength.

In the present invention, the plasticizer (D) comprises both (D1) an oil and (D2) at least one polymer selected from polybutene, polybutadiene, polyisobutylene, and polyisoprene (hereinafter also referred to as "polymer (D2)").

Examples of the oil (D1) include paraffin oil, naphthene oil, aromatic oil, and the like. The oil (D1) preferably has a weight average molecular weight of 200 to 1,000.

When the plasticizer (D) comprises the oil (D1), it can become easier to stick a pressure sensitive adhesion body on a member using the hot melt adhesive of the present invention.

The polymer (D2) is preferably comprised in an amount of 5 to 90 parts by weight, more preferably 10 to 65 parts by weight, and most preferably 15 to 55 parts by weight, based on 100 parts by weight of the total weight of the oil (D1) and the polymer (D2).

When the hot melt adhesive of the present invention has the above composition, it can be a pressure sensitive adhesive having higher performances.

The oil (D1) preferably comprises a naphthene oil.

It is possible to use, as the oil (D1), commercially available products. Examples thereof include White Oil Broom 350 (trade name) manufactured by Kukdong Oil & Chemical Co., Ltd.; Diana Fresia S32 (trade name), Diana Process Oil PW-90 (trade name), and DN Oil KP-68 (trade name) manufactured by Idemitsu Kosan Co., Ltd.; Nyflex 222B (trade name) manufactured by Nynas Pte Ltd.; KN4010 (trade name) manufactured by PetroChina Company; Enerper M1930 (trade name) manufactured by BP Chemicals Ltd.; Kaydol (trade name) manufactured by Crompton Corporation; and Primol 352 (trade name) manufactured by Esso Corp.

When the plasticizer (D) comprises the polymer (D2), it is possible to prevent a positional displacement of a pressure sensitive adhesion body using the hot melt adhesive in an embodiment of the present invention from a member at a high level, thus making it difficult to cause adhesive residue.

The polymer (D2) preferably has a weight average molecular weight of 2,000 to 100,000, and more preferably 3,000 to 80,000. The polymer (D2) most desirably comprises polybutene.

When the polymer (D2) has a weight average molecular weight in the above range, the compatibility between the oil (D1) and the polymer (D2) can be improved and the hot melt adhesive of the present invention is more excellent in initial adhesive strength and peel strength, thus making it difficult to cause adhesive residue, leading to be excellent in balance among performances.

It is possible to use, as the polymer (D2), commercially available products. Examples of the commercially available products include Nisseki Polybutene HV-300 (trade name) and Nisseki Polybutene HV-1900 (trade name) manufactured by Nippon Oil Corporation, Ltd.; B-1,000 (trade name) and BI-2000 (trade name) manufactured by Nippon Soda Co., Ltd.; Tetrax (trade name) and Himol (trade name) manufactured by JXTG Nippon Oil & Energy Corporation; LIR-15 (trade name) LIR-50 (trade name) manufactured by KURARAY CO., LTD.; NIPOL IR2200 (trade name) manufactured by Zeon Corporation, and the like.

<(E) Wax>

The hot melt adhesive of the present invention preferably comprises (E) a wax. As used herein, the "wax" refers to an organic substance having a weight average molecular weight of less than 10,000, which is solid at normal temperature and becomes liquid when heated, and is commonly considered as a "wax". There is no particularly limitation on the wax as long as the objective hot melt adhesive of the present invention can be obtained, if it has wax-like properties.

The wax (E) preferably comprises (E1) an olefin wax modified with carboxylic acid or carboxylic anhydride.

In the present invention, the "olefin wax modified with carboxylic acid or carboxylic anhydride (E1)" refers to an olefin wax which is chemically or physically processed with carboxylic acid or carboxylic anhydride, and there is no particular limitation as long as the objective hot melt adhesive of the present invention can be obtained. Examples of chemical or physical processing include oxidation, polymerization, blending, synthesis and the like.

Examples of the wax (E1) include a wax which is obtainable by graft polymerization of carboxylic acid or carboxylic anhydride with an olefin wax; and a wax which is obtainable by copolymerization of carboxylic acid or carboxylic anhydride on synthesizing an olefin wax by polymerization.

Therefore, the wax may be an olefin wax which is modified as a result of introduction of carboxylic acid or carboxylic anhydride into the "olefin wax" using various reactions.

There is no particular limitation on "carboxylic acid" and/or "carboxylic anhydride" to be used to modify the olefin wax as long as the objective hot melt adhesive of the present invention can be obtained.

Specific examples of the carboxylic acid or carboxylic anhydride include maleic acid, maleic anhydride, fumaric acid, fumaric anhydride, itaconic acid, acrylic acid, methacrylic acid and the like. These carboxylic acids and/or carboxylic anhydrides may be used alone, or in combination. Maleic acid and maleic anhydride are preferable, and maleic anhydride is particularly preferable.

The "olefin wax" modified with the carboxylic acid or carboxylic anhydride refers to a wax obtained by polymerization of olefin and is not particularly limited as long as the objective wax (E1) of the present invention can be obtained.

Specific examples of the olefin wax include a polyethylene wax, a polypropylene wax, a polyethylene/polypropylene wax, a polyethylene/polybutylene wax, a polyethylene/polybutene wax, and the like.

Therefore, the wax (E1) in the present invention is particularly preferably a polyolefin wax modified with maleic anhydride.

The "wax (E)" can comprise, in addition to the wax (E1), a base wax, and specific examples of the base wax include:
  synthetic waxes such as Fischer-Tropsch wax and polyolefin wax (e.g., polyethylene wax, polypropylene wax, polyethylene/polypropylene wax, etc.);
  petroleum waxes such as paraffin wax and microcrystalline wax; and
  natural waxes such as castor wax.

The base wax may be modified. A substance, with which the base wax is modified, may be various carboxylic acid derivatives as long as a polar group can be introduced. Examples of the "carboxylic acid derivatives" include:
  carboxylic acid esters such as ethyl acetate and vinyl acetate;
  acid halides such as benzoyl bromide;
  amides such as benzamide, N-methylacetamide, and N,N-dimethylformamide;
  imides such as succinimide;
  acyl azides such as acetyl azide;
  hydrazides such as propanoyl hydrazide;
  hydroxamic acids such as chloroacetylhydroxamic acid;
  lactones such as γ-butyrolactone; and
  lactams such as δ-caprolactam.

The modified base wax does not comprise (E1) an olefin wax modified with carboxylic acid or carboxylic anhydride.

In the present invention, the wax (E) preferably comprises, in addition to (E1), (E2) a Fischer-Tropsch wax mentioned as the base wax. The "Fischer-Tropsch wax (E2)" means a wax which is synthesized by the Fischer-Tropsch method and is commonly regarded as a Fischer-Tropsch wax. The Fischer-Tropsch wax is obtained by separating a wax from a wax in which component molecules have comparatively wide carbon number distribution, so that component molecules have comparatively narrow carbon number distribution. Typical Fischer-Tropsch waxes include Sasol H1 (trade name) and Sasol C80 (trade name), both of which being commercially available from Sasol Wax Corporation.

In the present invention, the wax (E1) preferably has a melting point of 100 to 130° C., and the base wax, preferably the wax (E2), preferably has a melting point of 60 to 90° C. The measurement method of the melting point is the same as that of the melting point of the component (A).

The wax (E) has an acid value of 5 to 200 mgKOH/g, and more preferably 20 to 160 mgKOH/g. The acid value can be measured by the method defined in ASTM D1308 or BWM 3.01A.

The hot melt adhesive according to the present invention may further comprise various additives, if necessary. Examples of the various additives include stabilizers and fine particle fillers.

The "stabilizer" is blended so as to improve stability of the hot melt adhesive by preventing decrease in molecular weight due to heat, as well as occurrence of gelation, coloration, and odor of the hot melt adhesive. There is no particular limitation on the stabilizer as long as the objective hot melt adhesive according to the present invention can be obtained. Examples of the "stabilizer" include an antioxidant and an ultraviolet absorber.

The "ultraviolet absorber" is used to improve light resistance of the hot melt adhesive. The "antioxidant" is used to depress oxidative degradation of the hot melt adhesive. There is no particular limitation on the antioxidant and ultraviolet absorber, as long as the antioxidant and ultraviolet absorber are generally used in pressure sensitive adhesives, and below-mentioned objective pressure sensitive adhesion bodies can be obtained.

Examples of the "antioxidant" include a phenol based antioxidant, a sulfur based antioxidant, and a phosphorus based antioxidant. Examples of the ultraviolet absorber include a benzotriazole based ultraviolet absorber and a benzophenone based ultraviolet absorber. A lactone based stabilizer can also be added. These antioxidants and ultraviolet absorbers can be used alone or in combination.

It is possible to use, as the stabilizer, commercially available products. Examples thereof include SUMILIZER GM (trade name), SUMILIZER TPD (trade name), and SUMILIZER TPS (trade name) manufactured by Sumitomo Chemical Co. Ltd.; IRGANOX 1010 (trade name), IRGANOX HP2225FF (trade name), IRGAFOS 168 (trade name), and IRGANOX 1520 (trade name) manufactured by Ciba Specialty Chemicals Inc.; and JF77 (trade name) manufactured by Johoku Chemical Co., Ltd. These stabilizers can be used alone or in combination.

The hot melt adhesive of the present invention can further comprise a fine particle filler. The fine particle filler may be commonly used fine particle filler, and there is no particular limitation as long as the objective hot melt adhesive of the present invention can be obtained. Examples of the "fine particle filler" include mica, calcium carbonate, kaolin, talc, titanium oxide, diatomaceous earth, urea based resin, styrene beads, calcined clay, starch, and the like. These particles preferably have a spherical shape, and there is no particular limitation on the size (diameter in the case of a spherical shape).

The hot melt adhesive of the present invention can be produced by blending the components (A) to (D), optionally blending the component (E), if necessary blending the various additives, and melting the mixture with heating, followed by mixing. Specifically, the hot melt adhesive can be produced by charging the above components in a melt-blending pot equipped with a stirrer, followed by blending with heating.

The hot melt adhesive of the present invention preferably comprises (A) a metallocene based propylene homopolymer having a melting point of 100° C. or lower, (B) a metallocene based ethylene/propylene copolymer, (C) a hydrogenated derivative of a petroleum hydrocarbon resin, (D1) a naphthene oil, and (D2) polybutene.

The polybutene (D2) is more preferably comprised in an amount of 5 to 90 parts by weight, still more preferably 5 to 60 parts by weight, and most preferably 15 to 60 parts by weight, based on 100 parts by weight of the total weight of the naphthene oil (D1) and the polybutene (D2).

When the hot melt adhesive of the present invention has the above composition, it can be a pressure sensitive adhesive having a higher performance.

The hot melt adhesive of the present invention preferably has a melt viscosity at 160° C. of 20,000 mPa·s or less, more preferably 1,000 to 20,000 mPa·s, and particularly preferably 1,500 to 15,000 mPa·s. The "melt viscosity" is a viscosity of a melt of the hot melt adhesive and is measured by a Brookfield RVT-type viscometer (spindle No. 27).

When the hot melt adhesive of the present invention has a melt viscosity at 160° C. in the above range, there is no need to increase an amount of additives such as a plasticizer, thus making it easier to maintain balance between holding force and releasability.

The hot melt adhesive of the present invention preferably has a glass transition temperature (Tg) of 15° C. or lower, more preferably −10° C. to 10° C., and most desirably preferably 0° C. to 10° C. When the hot melt adhesive has a glass transition temperature (Tg) in the above range, the hot melt adhesive does not become too hard, thus making it possible to firmly hold a pressure sensitive adhesion body on a member even in a cold district, preferably.

When the Tg of the hot melt adhesive is higher than the environmental temperature, the hot melt adhesive becomes a glassy state, thus making it more difficult to hold a pressure sensitive adhesion body on a member. Taking sticking of the pressure sensitive adhesion body in a cold district into consideration, the Tg of the hot melt adhesive is more preferably in the above range.

As used herein, the glass transition temperature (Tg) refers to a temperature which indicates a peak top of a peak obtained by plotting a loss tangent (tan δ) as a function of temperature, wherein the loss tangent is measured simultaneously with measurement of a storage modulus G' performed by fixing a frequency at 10 Rad/s using a dynamic viscoelasticity measuring instrument.

As mentioned above, the hot melt adhesive of the present invention can be widely employed for assembling of paper processing, bookbinding, vehicle members, disposable products, and the like, and can be most effectively employed as an adhesive component (pressure sensitive adhesive layer or pressure sensitive adhesion layer) of a pressure sensitive adhesion body such as a pressure sensitive adhesive tape, i.e., a pressure sensitive adhesive.

The pressure sensitive adhesion body of the present invention is obtained, for example, by forming the hot melt adhesive of the present invention as a pressure sensitive adhesive layer on a support for a tape, a film, a sheet, or the like. Specific examples of the support include polyethylene, polypropylene, polyvinyl fluoride, ethylene-vinyl acetate, acetal, polystyrene, polyethylene terephthalate, metal foil, paper, fiber, cloth, and the like.

After forming the hot melt adhesive on the support, the support may be sometimes wound up into a roll. Upon winding up, the pressure sensitive adhesive layer is contacted with a back surface of the support. However, even when the support is rewound in a reverse direction from the roll, the hot melt adhesive which is a pressure sensitive adhesive layer does not remain on the back surface of the support. Therefore, it becomes possible to efficiently produce a pressure sensitive adhesion body without applying a release agent on the back surface of the support and without interposing a release member (e.g., release paper, release film, etc.).

A pressure sensitive adhesion product comprises a product in which a release member such as a release paper or a film is stuck on a pressure sensitive adhesive layer of a pressure sensitive adhesion body. The pressure sensitive adhesion product also comprises a product in which a pressure sensitive adhesion body is stuck (or bonded) on a member of glass, metal, or plastic through the pressure sensitive adhesive layer.

The pressure sensitive adhesion product can be obtained by (1) once sticking a release member on a pressure sensitive adhesive layer formed on a pressure sensitive adhesion body, peeling the release member, and sticking the pressure sensitive adhesion body on a member (or adherend) through the pressure sensitive adhesive layer. The pressure sensitive adhesion product can also be obtained by (2) sticking a pressure sensitive adhesion body on a member (or adherend) through a pressure sensitive adhesive layer without once sticking a release member on the pressure sensitive adhesive layer of the pressure sensitive adhesion body.

Therefore, the "pressure sensitive adhesion product comprising a release member" refers to a product in which a release member is stuck on a pressure sensitive adhesive layer of a pressure sensitive adhesion body. The "pressure sensitive adhesion product comprising no release member" refers to a product in which a pressure sensitive adhesion body is stuck on a member through a pressure sensitive adhesive layer, and a product in which a release member is not stuck on a pressure sensitive adhesive layer.

Specific examples of the pressure sensitive adhesion product include a medical tape, an industrial tape, a sheet, a heat pack, a patch, a seal, a label, a nameplate, a reclosable fastener, and the like.

The "medical tape" includes, for example, a percutaneous absorbent containing a drug and a tape containing no drug, and is often a product in which a release member such as a film is stuck on a pressure sensitive adhesive layer. In this case, the medical tape is adhered to human skin after peeling a release member such as a film.

As used herein, the "industrial tape" refers to so-called sealing tape and curing tape. The industrial tape comprises a form having a release member and a form having no release member. When the industrial tape has a release member, the release member is peeled, and the tape is stuck on a member (or adherend) of metal, plastic, inorganic material, or the like.

When the "heat pack" is produced, examples of a support include a film and a nonwoven fabric of polyester, a pressure sensitive adhesive layer is formed on the support, and a release member is often stuck on the pressure sensitive adhesive layer. Examples of a member (or adherend) include clothes made of materials such as cotton, wool, silk, rayon, and polyester.

When the "label" is produced, paper and plastic are used as a support. After peeling a release member from a pressure sensitive adhesion body made of paper, the pressure sensitive adhesion body is stuck on a bottle (glass), a can (metal), a plastic, and the like, and may be used in beverage applications.

As mentioned above, the pressure sensitive adhesion product according to the present invention comprises various embodiments, and is designed such that a pressure sensitive adhesion layer does not remain on a member and undergoes interfacial peeling when a pressure sensitive adhesion body is peeled from the member.

There is no particular limitation on a method of applying the hot melt adhesive. The coating method is, for example, roughly classified into contact coating and non-contact coating. The "contact coating" means a coating method in which a dispenser is brought into contact with a member or a film in application of a hot melt adhesive, whereas the "non-contact coating" means a coating method in which a dispenser is not brought into contact with a member or a film in application of a hot melt adhesive. Examples of the contact coating method include a slot coater coating and a roll coater coating. Examples of the non-contact coating method include a spiral coating method capable of spiral coating, omega coating and control seam coating methods capable of wavy coating, slot spray coating and curtain spray coating methods capable of planar coating, a dot coating method capable of spot-like coating, and the like.

The hot melt adhesive is applied to a support by the above coating method to produce a pressure sensitive adhesion body. A release member is stuck on the pressure sensitive adhesion body, or the pressure sensitive adhesion body is stuck on a member to obtain various pressure sensitive adhesion products.

EXAMPLES

The present invention will be described for the purpose of describing the present invention in more detail and specific manner by way of Examples. These are exemplary of the present invention and are not to be considered as limiting.

Components for blending a hot melt adhesive are shown below.

(A) Metallocene Based Propylene Homopolymer
(A1) Metallocene based propylene homopolymer (melting point of 75° C., weight average molecular weight of 45,000) (L-MODU X400S (trade name) manufactured by Idemitsu Kosan Co., Ltd.)
(A2) Metallocene based propylene homopolymer (melting point of 80° C., weight average molecular weight of 70,000) (L-MODU X600S (trade name) manufactured by Idemitsu Kosan Co., Ltd.)
(A3) Metallocene based propylene homopolymer (melting point of 90° C., weight average molecular weight of 130,000) (L-MODU X900S (trade name) manufactured by Idemitsu Kosan Co., Ltd.)
(A'4) Ziegler-Natta based propylene homopolymer (melting point of 145° C.) (Eastoflex P1010 (trade name) manufactured by Eastman Chemical Company)
(A'5) Metallocene based polyethylene homopolymer (melting point of 115° C.) (EXCEREX 07500 (trade name) manufactured by Mitsui Chemicals Inc.)
(B) Metallocene Based Ethylene/α-Olefin Copolymer
(B1) Metallocene based ethylene/propylene copolymer (melt index of 20 (g/10 min: 230° C.)) (Vistamaxx 6202 (trade name) manufactured by Exxon Mobil Corporation)
(B2) Metallocene based ethylene/octene copolymer (melt index of 15 (g/10 min: 190° C.)) (INFUSE 9807 (trade name) manufactured by The Dow Chemical Company)
(B3) Metallocene based ethylene/octene copolymer (melt index of 500 (g/10 min: 190° C.)) (AFFINITY GA1950 (trade name) manufactured by The Dow Chemical Company)
(B'4) Styrene-butadiene block copolymer (Asaprene T-438 (trade name) manufactured by Asahi Kasei Chemicals Corporation)
(B'5) Polylactic acid resin (Biopolymer 4060D (trade name) manufactured by Nature Works LLC)
(C) Tackifier Resin
(C1) Hydrogenated dicyclopentadiene based resin (T-REZ HA103 (trade name) manufactured by JXTG Nippon Oil & Energy Corporation)
(C2) Petroleum based hydrocarbon resin (LUHOREZ A1100S (trade name) manufactured by ZIBO QILU YIXI LUHUA CHEMICAL)
(D) Plasticizer
(D1) Oil
(D1-1) Naphthene oil (weight average molecular weight of 400) (KN40102 (trade name) manufactured by PetroChina Company)

(D1-2) Paraffin oil (weight average molecular weight of 500) (Diana Frecia S32 (trade name) manufactured by Idemitsu Kosan Co., Ltd.)
(D2) Polymer selected from polybutene, polybutadiene, polyisobutylene, and polyisoprene
(D2-1) Polybutene (weight average molecular weight of 3,500) (Nisseki Polybutene HV-300 (trade name) manufactured by Nippon Oil Corporation, Ltd.)
(D2-2) Polybutadiene (weight average molecular weight of 4,000) (NISSO-PB B-1,000 (trade name) manufactured by Nippon Soda Co., Ltd.)
(D2-3) Hydrogenated polybutadiene (weight average molecular weight of 50,000) (NISSO-PB BI-2000 (trade name) manufactured by Nippon Soda Co., Ltd.)
(D2-4) Polyisobutylene (weight average molecular weight of 56,000) (HIMOL 4H (trade name) manufactured by JXTG Nippon Oil & Energy Corporation)
(D2-5) Polyisoprene (weight average molecular weight of 66,000) (Kurapren LIR-50 (trade name) manufactured by KURARAY CO., LTD.)
(E) Wax
(E1) Maleic acid modified wax (LICOCENE MA6252TP (trade name) manufactured by Clariant Corporation)
(E2) Solid paraffin (Paraffin Wax-155 (trade name) manufactured by NIPPON SEIRO CO., LTD.)
(F) Antioxidant
(F1) Hindered phenol based antioxidant (ADK STAB AO-60 (trade name) manufactured by ADEKA Corporation)

Using a universal stirrer, components (A) to (F) were blended according to the formulations shown in Tables 1 and 2, and then melt-blended at 150° C. for 2 hours to prepare hot melt adhesives of Examples 1 to 13 and Comparative Examples 1 to 10.

TABLE 1

| | | Examples | | | | | | | | | | | | |
|---|---|---|---|---|---|---|---|---|---|---|---|---|---|---|
| | | 1 | 2 | 3 | 3 | 4 | 5 | 6 | 7 | 8 | 9 | 10 | 11 | 12 | 13 |
| A | A1 | 34 | 24 | 30 | 30 | 34 | 25 | 35 | 35 | 35 | 35 | | | 25 | 25 |
| | A2 | | | | | | | | | | | 35 | | | |
| | A3 | | | | | | | | | | | | 35 | | |
| B | B1 | 53 | 50 | 46 | 46 | 53 | 50 | 50 | 50 | 50 | 50 | 50 | 50 | | |
| | B2 | | | | | | | | | | | | | 50 | |
| | B3 | | | | | | | | | | | | | | 50 |
| C | C1 | 100 | 60 | 90 | 90 | 120 | 60 | 100 | 100 | 100 | 100 | 100 | 100 | 90 | 100 |
| | C2 | | 30 | | | | 30 | | | | | | | | |
| D1 | D1-1 | 85 | 75 | 45 | 10 | 95 | | 80 | 80 | 80 | 80 | 75 | 75 | 75 | 75 |
| | D1-2 | | | | | | 80 | | | | | | | | |
| D2 | D2-1 | 15 | 25 | 55 | 90 | 5 | 20 | | | | | 25 | 25 | 25 | 25 |
| | D2-2 | | | | | | | 20 | | | | | | | |
| | D2-3 | | | | | | | | 20 | | | | | | |
| | D2-4 | | | | | | | | | 20 | | | | | |
| | D2-5 | | | | | | | | | | 20 | | | | |
| E | E1 | 2 | | | | 2 | | | | | | | | | |
| | E2 | | | | | | 0.1 | | | | | | | | |
| F | F1 | 3 | 3 | 3 | 3 | 3 | 3 | 3 | 3 | 3 | 3 | 4 | 4 | 4 | 4 |
| Glass transition temperature (° C.) | | 8 | 0 | 2 | 8 | 10 | −10 | 4 | 6 | 9 | 8 | 9 | 10 | 10 | 8 |
| Melt viscosity at 160° C. (mPa·s) | | 8,400 | 9,000 | 11,500 | 12,000 | 7,400 | 5,500 | 7,200 | 7,400 | 12700 | 11,000 | 53,00 | 15,500 | 2,100 | 1,800 |
| Loop tack (initial adhesive strength) | | A | A | A | A | A | A | A | A | B | B | A | B | B | A |
| SUS | Peel strength (holding force) | A | A | A | B | B | B | B | B | B | B | A | B | B | B |
| | Adhesive residue | A | A | A | A | A | A | A | A | A | A | A | A | A | B |
| Glass | Peel strength (holding force) | A | A | A | B | B | B | A | A | B | B | A | A | A | A |
| | Adhesive residue | A | A | A | A | A | A | B | B | A | B | A | A | B | B |
| PP | Peel strength (holding force) | A | A | A | B | B | B | A | A | B | B | B | B | B | B |
| | Adhesive residue | A | A | A | A | B | B | A | B | A | B | A | B | B | B |

TABLE 1-continued

| | | Examples | | | | | | | | | | | | |
|---|---|---|---|---|---|---|---|---|---|---|---|---|---|---|
| | | 1 | 2 | 3 | 3 | 4 | 5 | 6 | 7 | 8 | 9 | 10 | 11 | 12 | 13 |
| PE | Peel strength (holding force) | A | A | A | B | B | B | A | B | B | B | B | B | A | A |
| | Adhesive residue | A | A | A | A | A | A | B | A | A | B | A | A | B | B |

TABLE 2

| | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| A | A1 | 35 | 34 | 34 | | 100 | 40 | | | 40 | 40 |
| | A2 | 30 | | | | | | | | | |
| | A4' | | | | | | | 40 | | | |
| | A5' | | | | | | | | 40 | | |
| B | B1 | 22 | 53 | 53 | 100 | | 60 | 60 | 60 | | |
| | B4' | | | | | | | | | 60 | |
| | B5' | | | | | | | | | | 60 |
| C | C1 | 87 | 130 | 130 | 135 | 135 | | 135 | 135 | 135 | 135 |
| | C2 | 31 | | | | | | | | | |
| D1 | D1-1 | 100 | | | 80 | 80 | 80 | 75 | 75 | 75 | 75 |
| | D1-2 | | 100 | | | | | | | | |
| D2 | D2-1 | | | 100 | 20 | 20 | 20 | 25 | 25 | 25 | 25 |
| E | E1 | 3 | 3 | 3 | | | | | | | |
| F | F1 | 4 | 4 | 4 | 4 | 4 | 4 | 4 | 4 | 4 | 4 |
| | Glass transition temperature (° C.) | 11 | 16 | 10 | 8 | 7 | 5 | 15 | 15 | 13 | — |
| | Melt viscosity at 160° C. (mPa · s) | 2,400 | 700 | 23,000 | 6,300 | 3,000 | 2,000 | 7,500 | 3,700 | 2,200 | — |
| | Loop tack (initial adhesive strength) | B | A | D | C | C | D | A | D | A | — |
| SUS | Peel strength (holding force) | B | A | A | B | D | D | A | D | C | — |
| | Adhesive residue | B | D | A | A | — | — | A | — | A | — |
| Glass | Peel strength (holding force) | A | C | B | D | C | D | A | A | C | — |
| | Adhesive residue | C | D | B | A | D | — | C | B | C | — |
| PP | Peel strength (holding force) | C | B | B | B | A | D | A | B | A | — |
| | Adhesive residue | D | D | B | B | D | D | D | C | D | — |
| PE | Peel strength (holding force) | B | D | B | B | A | D | B | D | D | — |
| | Adhesive residue | D | — | A | A | D | — | A | — | — | — |

All numerical values with respect to the compositions (formulations) of the hot melt adhesives shown in Table 1 and Table 2 are numerical values in terms of parts by weight. Regarding each of the hot melt adhesives (Examples and Comparative Examples), glass transition temperature (Tg), melt viscosity at 160° C., tack, peel strength, and adhesive residue were evaluated. Outlines of each evaluation will be described below.

<Glass Transition Temperature>

Using a dynamic viscoelasticity measuring instrument (Rheometer AR-G2 (trade name) manufactured by TA Instruments Japan Inc.), a glass transition temperature was measured. Each of the hot melt adhesives was heated by a jig of the instrument and then formed into a disk shape having a diameter of 25 mmφ and a thickness of 1,500 μm. Using a parallel plate made of stainless steel, an angular rate was fixed at 10 rad/s and the glass transition temperature was measured in a temperature sweep mode at a rate of 5° C./min by heating in a range of −25° C. to 150° C. In a temperature range of a softening point or lower, a loss tangent Tan δ (G"/G') represented by a ratio of a loss modulus (G") to a storage modulus (G') is measured. The loss tangent Tan δ was plotted as a function of a temperature. The temperature indicating a peak top of an obtained peak was read and regarded as a glass transition temperature of the hot melt adhesive.

<Measurement of Melt Viscosity (160° C.)>

In accordance with the method B defined in JAI7-1991, a viscosity at 160° C. of each of the hot melt adhesives was measured. In the measurement, a Brookfield viscometer and a No. 27 rotor were used.

<Tack (Initial Adhesive Strength)>

Each of the hot melt adhesives was applied on a 50 μm thick PET film (50 cm in length×24 cm in width) to form a 50 μm thick pressure sensitive adhesive layer. This PET film was formed (or cut) into a size measuring 2.5 cm×10 cm to obtain specimens. Each specimen was wound in a loop form such that a surface (surface to be coated with an adhesive) of the pressure sensitive adhesive layer faces outside, and then the wound specimen was brought into contact with a member (PE sheet) at 20° C. at a rate of 300 mm/min to thereby stick the specimen to the member. Then, the specimen was peeled from the PE sheet at a rate of 300 mm/min to thereby measure the strength at the time of peeling, followed by evaluation of tack.

A: Loop tack exceeds 1,500 (g/25 mm).
B: Loop tack is 1,000 (g/25 mm) or more and less than 1,500 (g/25 mm).
C: Loop tack is 500 (g/25 mm) or more and less than 1,000 (g/25 mm).
D: Loop tack is less than 500 (g/25 mm).

<Peel Strength (Holding Force)>

A specimen fabricated under a condition which is the same as that in the above-mentioned tack was stuck on each of members (1) to (4) mentioned below such that a surface (surface to be coated with an adhesive) of the pressure sensitive layer faces the member, and then a load was applied by one reciprocal motion using a 200 g of a rubber roller to obtain samples for evaluation. Four kinds of materials such as (1) SUS304, (2) glass, (3) PE, and (4) PP were used as the member.

Each sample for evaluation was aged in an atmosphere at 23° C. under 65% R.H. for 18 hours or more, and then a peel test was carried out in the atmosphere at 23° C. under 65% R.H. The peel test was carried out by Autograph AGS-J manufactured by Shimadzu Corporation under the following conditions.

Peel direction: Direction which is the same as that of movement of the base material (MD) direction.
Distance between chucks: 20 mm
Peel speed: 300 mm/min
Peel length: 50 mm
Analysis method: average of testing force With respect to each of the hot melt adhesives (Examples and Comparative Examples), at least three samples were fabricated and then measured three times. The peel strength was determined by the obtained average. The peel strength was evaluated by the following criteria.

(1) SUS
  A: Peel strength is 10 N or more.
  B: Peel strength is 5 N or more and less than 10 N.
  C: Peel strength is 2 N or more and less than 5 N.
  D: Peel strength is less than 2 N.
(2) Glass
  A: Peel strength is 10 N or more.
  B: Peel strength is 5 N or more and less than 10 N.
  C: Peel strength is 2 N or more and less than 5 N.
  D: Peel strength is less than 2 N.
(3) PE
  A: Peel strength is 20 N or more.
  B: Peel strength is 10 N or more and less than 20 N.
  C: Peel strength is 2 N or more and less than 10 N.
  D: Peel strength is less than 2 N.
(4) PP
  A: Peel strength is 10 N or more.
  B: Peel strength is 5 N or more and less than 10 N.
  C: Peel strength is 2 N or more and less than 5 N.
  D: Peel strength is less than 2 N.

<Adhesive Residue (or Adhesive Deposit)>

After the measurement of the peel strength, the presence of adhesive residue (whether the adhesive remains on the peeling surface or not) was evaluated by immediately touching the peeling surface of the peeling member with a finger. The evaluation criteria of adhesive residue are shown below.

A: No adhesive residue
B: Slight adhesive residue
C: A little adhesive residue
D: Obvious adhesive residue
: Exempt from evaluation because of peel strength of less than 2 N As shown in Table 1, each of the hot melt adhesives of Examples 1 to 13 is excellent in balance among initial adhesive strength, holding force, and releasability. More specifically, each of the hot melt adhesives is excellent in initial adhesive strength and holding force and hardly causes adhesive residue, thus proving that each of the hot melt adhesives of Examples is useful as a pressure sensitive adhesive.

Whereas, as shown in Table 2, each of the hot melt adhesives of Comparative Examples 1 to 10 does not comprise any one of the components (A) to (C), (D1), and (D2) and is therefore significantly inferior in any one of the performances as compared with the hot melt adhesives of Examples. Namely, the hot melt adhesives have performance rated as "D". The hot melt adhesives of Comparative Examples are not excellent in balance among initial adhesive strength, holding force, and releasability.

These results revealed that the hot melt adhesives comprising components (A) to (C), (D1), and (D2) enable a pressure sensitive adhesion body to stick easily and exhibit higher holding force on a member, and hardly cause adhesive residue, and are therefore effective as a pressure sensitive adhesive.

INDUSTRIAL APPLICABILITY

The present invention can provide a hot melt adhesive which is useful as a pressure sensitive adhesive, and a pressure sensitive adhesion (or adhesive) body coated with the hot melt adhesive.

The invention claimed is:

1. A hot melt adhesive comprising: (A) a metallocene based propylene homopolymer, (B) a metallocene based ethylene/α-olefin copolymer, (C) a tackifier resin, and (D) a plasticizer,
   wherein the amount of the (A) metallocene based propylene homopolymer ranges from 15 to 45 parts by weight, based on 100 parts by weight of the total weight of the (A) metallocene based propylene homopolymer and the (B) metallocene based ethylene/α-olefin copolymer;
   wherein the plasticizer (D) consists of (D1) an oil having a weight average molecular weight of 200 to 1,000 and (D2) at least one polymer having a weight average molecular weight of 2,000 to 100,000 selected from polybutene, polybutadiene, and polyisobutylene and the (D2) at least one polymer is present in an amount of 15 to 55 parts by weight, based on 100 parts by weight of the total weight of the plasticizer (D); and
   wherein the hot melt adhesive is a pressure sensitive adhesive.

2. The hot melt adhesive according to claim 1, wherein the oil (D1) comprises a naphthene oil.

3. The hot melt adhesive according to claim 1, wherein the polymer (D2) comprises polybutene.

4. The hot melt adhesive according to claim 1, wherein the metallocene based propylene homopolymer (A) has a melting point of 100° C. or lower.

* * * * *